Patented June 16, 1953

2,642,440

UNITED STATES PATENT OFFICE 2,642,440

NITROTHIENYL KETONES

Kenneth L. Kreuz, Fishkill, N. Y., and Charles D. Hurd, Evanston, Ill., assignors to The Texas Company, New York, N. Y., a corporation of Delaware No Drawing. Application October 7, 1948, Serial No. 53,378

6 Claims. (Cl. 260—332.3)

1

This invention relates to the preparation of a novel class of nitrothienyl ketones. More specifically, the invention discloses a novel class of thiophene compounds which are substituted in the 4-position with a nitro group and which contain an aliphatic ketone group in the 2-position.

The novel class of compounds of this invention comprises nitrothienyl ketones of the following general formula:

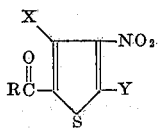

wherein X is hydrogen, an alkyl group or an alkenyl group; R is an alkyl or an alkenyl group; Y is a hydroxyl group, an alkoxy group, an alkenoxy group, an aryloxy group, an amino group, an alkyl-, alkenyl-, or aryl-substituted amino group.

The novel class of compounds of this invention are useful as chemical intermediates in the preparation of pharmaceuticals, dyes, insecticides, fungicides and bactericides. 3-nitro-5-acetyl-2-thienol, methyl 5-ethoxy-4-nitro-2-thienyl ketone and methyl 5-n-butylamino-4-nitro-2-thienyl ketone are representative examples of the novel class of compounds of this invention. 3-nitro-5-acetyl-2-thienol is a solid which crystallizes in the form of colorless micro crystals and which melts with decomposition at 65° C.; methyl 5-ethoxy-4-nitro-2-thienyl ketone is a colorless crystalline substance which melts at 125–126° C.; methyl 5-n-butylamino-4-nitro-2-thienyl ketone crystallizes from methanol in fine yellow needles melting at 96.5–97.5° C.

The preparation of the novel class of compounds of this invention is illustrated in the following examples. It is to be understood, however, that no limitation is thereby intended.

Example I

Ninety-six grams of 2-chlorothiophene was reacted with 63 grams of acetyl chloride in 500 cc. of petroleum ether employing 108 grams of aluminum chloride as a catalyst. Methyl 5-chloro-2-thienyl ketone, which was obtained in a yield of better than 90 per cent, was distilled at 85° C. at 5 mm. pressure. No evidence was obtained that the product, melting point 45–47° C., consisted of a mixture of methyl 2-chloro-3-thienyl ketone and methyl 5-chloro-2-thienyl ketone.

2

Forty-eight grams of methyl-5-chloro-2-thienyl ketone in 300 cc. of sulfuric acid (density 1.84) was nitrated with a mixture of 26.5 grams of nitric acid (density 1.42) and 30 cc. of sulfuric acid (density 1.84) at 0 to 5° C. Crude methyl 5-chloro-4-nitro-2-thienyl ketone melting at 60 to 80° C. was obtained in 91 per cent yield. Recrystallization from methanol gave a pure product in the form of large colorless prisms which melted at 85 to 87° C. Six and one-tenth grams of methyl 5-chloro-4-nitro-2-thienyl ketone was reacted with 4.09 grams of sodium formate in 250 cc. of anhydrous methanol under reflux for a period of 48 hours. A product was obtained consisting of unchanged starting material and a yellow sodium salt of 3-nitro-5-acetylthienol. The free thienol was obtained by acidification with hydrochloric acid in a yield of about 50 per cent based on the methyl 5-chloro-4-nitro-2-thienyl ketone reacted with sodium formate. After recrystallization from methylene chloride, 3-nitro-5-acetyl-2-thienol was obtained as colorless microcrystals which melted with decomposition at 65° C. The free thienol is readily soluble in both ether and water; a 0.01M aqueous solution showed a pH of 2.25 indicating a dissociation constant of $6.7 \times 10^{-3}$. In electrometric titration against alkali, it behaved as a typical strong acid; the free thienol showed a neutral equivalent of 184 as compared with a calculated value of 187.

Example II

Four and one-tenth grams of methyl 5-chloro-4-nitro-2-thienyl ketone was reacted with 50 cc. of methyl alcohol and 1.2 grams of potassium hydroxide in 1.2 cc. water under reflux for 10 minutes. Methyl 5-methoxy-4-nitro-2-thienyl ketone was obtained in 70 to 80 per cent yield; the methoxy compound recrystallized from methanol in the form of cottony needles which melted at 158–159° C. Elementary analysis of methyl 5-methoxy-4-nitro-2-thienyl ketone gave observed values of 6.74 per cent for nitrogen, as compared with a theoretical value of 6.97 per cent.

Example III

One gram of methyl 5-chloro-4-nitro-2-thienyl ketone was reacted with 100 cc. of ethyl alcohol and 0.56 gram of potassium hydroxide in 0.5 cc. of water whereby methyl 5-ethoxy-4-nitro-2-thienyl ketone was obtained in a yield of about 50 per cent. The crystalline ethoxy ketone so obtained melted at 125 to 126° C. after recrystallization from methanol. Elementary analysis of methyl 5-ethoxy-4-nitro-2-thienyl ketone gave an observed value of 6.95 per cent for nitrogen as compared with a theoretical value of 6.51 per cent.

*Example IV*

One gram of methyl 5-chloro-4-nitro-2-thienyl ketone was reacted with 0.70 gram of potassium phenoxide by warming an intimate mixture of the two on the steam bath whereby methyl 5-phenoxy-4-nitro-2-thienyl ketone was obtained in a yield of about 70 per cent. The phenoxy ketone so obtained melted at 122–123° C. Elementary analysis of methyl 5-phenoxy-4-nitro-2-thienyl ketone gave an observed value of 5.14 per cent nitrogen as compared with a calculated theoretical value of 5.33 per cent.

*Example V*

One gram of methyl 5-chloro-4-nitro-2-thienyl ketone was reacted with 3.5 cc. of concentrated ammonium hydroxide in 25 cc. methanol at reflux temperature for one hour, whereby methyl 5-amino-4-nitro-2-thienyl ketone was obtained in a yield of about 85 per cent. After recrystallization from methyl alcohol, the amino ketone was obtained in the form of yellow needles which melted with slight decomposition at 225–227° C. Elementary analysis of methyl 5-amino-4-nitro-2-thienyl ketone gave an observed value of 15.06 per cent for nitrogen as compared with a calculated theoretical value of 15.05 per cent.

*Example VI*

One-half gram of methyl 5-chloro-4-nitro-2-thienyl ketone was reacted with 1 gram of n-butylamine in 10 cc. methanol at reflux temperature whereby crystalline methyl 5-n-butylamino-4-nitro-2-thienyl ketone was obtained after cooling, acidifying and diluting with water. Recrystallization from hexane yielded fine yellow needles, melting point 96.5–97.5° C., free from halogen. Elementary analysis of methyl 5-n-butylamino-4-nitro-2-thienyl ketone gave an observed value of 11.46 per cent for nitrogen as compared with a calculated theoretical value of 11.56 per cent.

*Example VII*

Two-tenths gram of methyl 5-chloro-4-nitro-2-thienyl ketone was reacted with 1 gram of aniline in 10 cc. of methanol at reflux temperature whereby methyl 5-phenylamino-4-nitro-2-thienyl ketone was obtained in a yield of about 80 per cent. After recrystallization from methanol, methyl 5-phenylamino-4-nitro-2-thienyl ketone was obtained in the form of orange needles which melted at 138.5 to 139.5° C. Elementary analysis of methyl 5-phenylamino-4-nitro-2-thienyl ketone gave an observed value of 11.11 per cent for nitrogen, as compared with a calculated theoretical value of 10.68 per cent.

Obviously many modifications and variations of the invention, as hereinbefore set forth, may be made without departing from the spirit and scope thereof and, therefore, only such limitations should be imposed as are indicated in the appended claims.

We claim:

1. Nitrothienyl ketones having the general formula

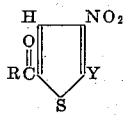

wherein Y is a radical selected from the group consisting of —OH, —OR, —OC$_6$H$_5$, —NH$_2$, —NHR and —NHC$_6$H$_5$ and R is an alkyl radical.

2. 3-nitro-5-acetyl-2-thienol.
3. Methyl 5-ethoxy-4-nitro-2-thienyl ketone.
4. Methyl 5-amino-4-nitro-2-thienyl ketone.
5. Methyl 5-n-butylamino-4-nitro-2-thienyl ketone.
6. Methyl 5-n-phenylamino-4-nitro-2-thienyl ketone.

KENNETH L. KREUZ.
CHARLES D. HURD.

References Cited in the file of this patent

UNITED STATES PATENTS

| Number | Name | Date |
| --- | --- | --- |
| 2,497,145 | Terry | Feb. 14, 1950 |

OTHER REFERENCES

Rinkes, Rec. Trav. Chem. 53, 643–51 (1934).
J. Am. Chem. Soc. 60, 2907 (1938).
J. Bacteriology 56, 650 (1948).